United States Patent
Meroux et al.

(10) Patent No.: US 11,053,873 B2
(45) Date of Patent: Jul. 6, 2021

(54) METHOD AND SYSTEM FOR IMPROVING VEHICLE MOTIVE POWER SOURCE STOP/START CONTROL VIA MACHINE LEARNING

(71) Applicant: Ford Global Technologies, LLC, Dearborn, MI (US)

(72) Inventors: Dominique Meroux, Fair Oaks, CA (US); Sravani Yajamanam Kidambi, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 16/270,504

(22) Filed: Feb. 7, 2019

(65) Prior Publication Data
US 2020/0255014 A1    Aug. 13, 2020

(51) Int. Cl.
*F02D 41/04* (2006.01)
*B60W 30/188* (2012.01)
*G06N 20/00* (2019.01)
*B60W 30/18* (2012.01)

(52) U.S. Cl.
CPC ......... *F02D 41/042* (2013.01); *B60W 30/188* (2013.01); *B60W 30/18018* (2013.01); *B60W 30/18054* (2013.01); *B60W 30/18159* (2020.02); *G06N 20/00* (2019.01); *B60W 2420/42* (2013.01); *B60W 2510/188* (2013.01); *B60W 2540/12* (2013.01); *B60W 2540/16* (2013.01); *B60W 2540/30* (2013.01); *B60W 2710/0627* (2013.01)

(58) Field of Classification Search
CPC ......... B60W 30/188; B60W 30/18159; B60W 30/18018; B60W 30/18054; B60W 30/18072; F02D 41/042; F02D 41/045; F02D 41/06–065; F02N 11/0814–0844
USPC .................................................. 701/112–113
See application file for complete search history.

(56) References Cited

U.S. PATENT DOCUMENTS

| | | | |
|---|---|---|---|
| 6,317,666 B1 * | 11/2001 | List | G01M 17/007 123/205 |
| 8,738,523 B1 * | 5/2014 | Sanchez | G06Q 40/08 705/39 |
| 8,930,057 B2 | 1/2015 | Otake | |
| 9,151,263 B2 | 10/2015 | Hrovat et al. | |
| 9,266,520 B2 | 2/2016 | Pebley et al. | |
| 2001/0056544 A1 * | 12/2001 | Walker | B60T 7/18 726/2 |
| 2010/0168992 A1 * | 7/2010 | Nakata | F02D 29/02 701/112 |

(Continued)

FOREIGN PATENT DOCUMENTS

WO    2013113600 A1    8/2013

*Primary Examiner* — Erick R Solis
*Assistant Examiner* — Robert A Werner
(74) *Attorney, Agent, or Firm* — Geoffrey Brumbaugh; McCoy Russell LLP (57) ABSTRACT

Methods and systems are presented for improving engaging automatic vehicle motive power source stopping and inhibiting automatic vehicle motive power source stopping. The methods and systems include processing driver inputs in a machine learning model and characterizing the driver in one of a plurality of driver groups. Automatic vehicle motive power source stopping and starting may be adjusted responsive to a group in which a driver is a member.

11 Claims, 8 Drawing Sheets

(56) References Cited

U.S. PATENT DOCUMENTS

| | | | |
|---|---|---|---|
| 2011/0112740 A1* | 5/2011 | Hashimoto | F02D 17/02 |
| | | | 701/70 |
| 2013/0345952 A1* | 12/2013 | Tsumori | F02D 29/02 |
| | | | 701/113 |
| 2014/0257677 A1* | 9/2014 | Sangameswaran | F02D 45/00 |
| | | | 701/112 |
| 2014/0343830 A1* | 11/2014 | Elwart | F02N 11/0837 |
| | | | 701/112 |
| 2015/0006064 A1* | 1/2015 | Dextreit | F02D 35/00 |
| | | | 701/112 |
| 2016/0215747 A1* | 7/2016 | Huber | F02N 11/0837 |
| 2016/0305388 A1 | 10/2016 | Miller et al. | |
| 2016/0339922 A1* | 11/2016 | Schmidt | B60W 40/08 |
| 2018/0023493 A1* | 1/2018 | Khafagy | F16H 63/50 |
| | | | 477/98 |
| 2018/0079421 A1* | 3/2018 | Chen | B60W 30/192 |
| 2020/0191069 A1* | 6/2020 | Naidu | F02D 41/2451 |

\* cited by examiner

METHOD AND SYSTEM FOR IMPROVING VEHICLE MOTIVE POWER SOURCE STOP/START CONTROL VIA MACHINE LEARNING

FIELD

The present description relates generally to methods and systems for controlling automatic stopping of a vehicle motive power source.

BACKGROUND/SUMMARY

A vehicle motive power source of a vehicle may be automatically stopped (e.g., not rotating and not combusting fuel or not performing a chemical process) during conditions where driver demand torque or power is low. By stopping the vehicle motive power source, fuel consumption and vehicle motive power source emissions may be reduced. The vehicle motive power source may be stopped in response to brake pedal position and accelerator pedal position. In one example, the vehicle motive power source may be automatically stopped when the brake pedal is applied while the accelerator pedal is released and vehicle speed is zero. However, such rigid automatic vehicle motive power source stopping conditions may not be suitable for all vehicle drivers under all driving conditions. For example, a vehicle's driver may prefer to keep the vehicle motive power source operating when the vehicle is operating in frequent stop and go conditions, such as during traffic congestion. Further, the vehicle's driver may prefer to remain with the vehicle motive power source automatically stopped, but the vehicle motive power source may be automatically restarted after the vehicle motive power source has been stopped for more than two minutes. Therefore, it may be desirable to provide a way of determining when stopping the vehicle motive power source may be advantageous and acceptable to the vehicle's driver.

The inventors herein have recognized the above-mentioned issue and have developed a vehicle motive power source operating method, comprising: identifying present operating conditions of a vehicle via a controller responsive to a combination of data provided from inputs such as a camera and data provided via a range sensing device; assigning a human driver to one of a plurality of driver groups via a trained machine learning model; automatically stopping a vehicle motive power source via the controller responsive to the human driver being assigned to a group included in the plurality of driver groups and the present operating conditions.

By assigning a driver to one of a plurality of driver groups and identifying vehicle operating conditions, it may be possible to adjust automatic vehicle motive power source stopping and starting conditions to suit preferences of the driver. For example, a driver that is characterized as a performance driver may wish to sacrifice vehicle fuel economy for vehicle performance. As such, it may be desirable to keep the vehicle's motive power source running during conditions of stop and go traffic where the performance driver may wish to keep a distance between his or her vehicle and another vehicle small. Conversely, if the driver is characterized as being economical, then the vehicle motive power source may be automatically stopped and started as traffic stops and starts. In this way, a vehicle's driver and present vehicle operating conditions may influence automatic vehicle motive power source stopping and starting so that the driver's expectations may be met.

The present description may provide several advantages. In particular, the approach may reduce fuel consumption and while reducing vehicle occupant disturbances. Additionally, the approach may decrease vehicle emissions and improve repeatability of vehicle motive power source stopping conditions. Further, the approach may also improve vehicle operation during parking of the vehicle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
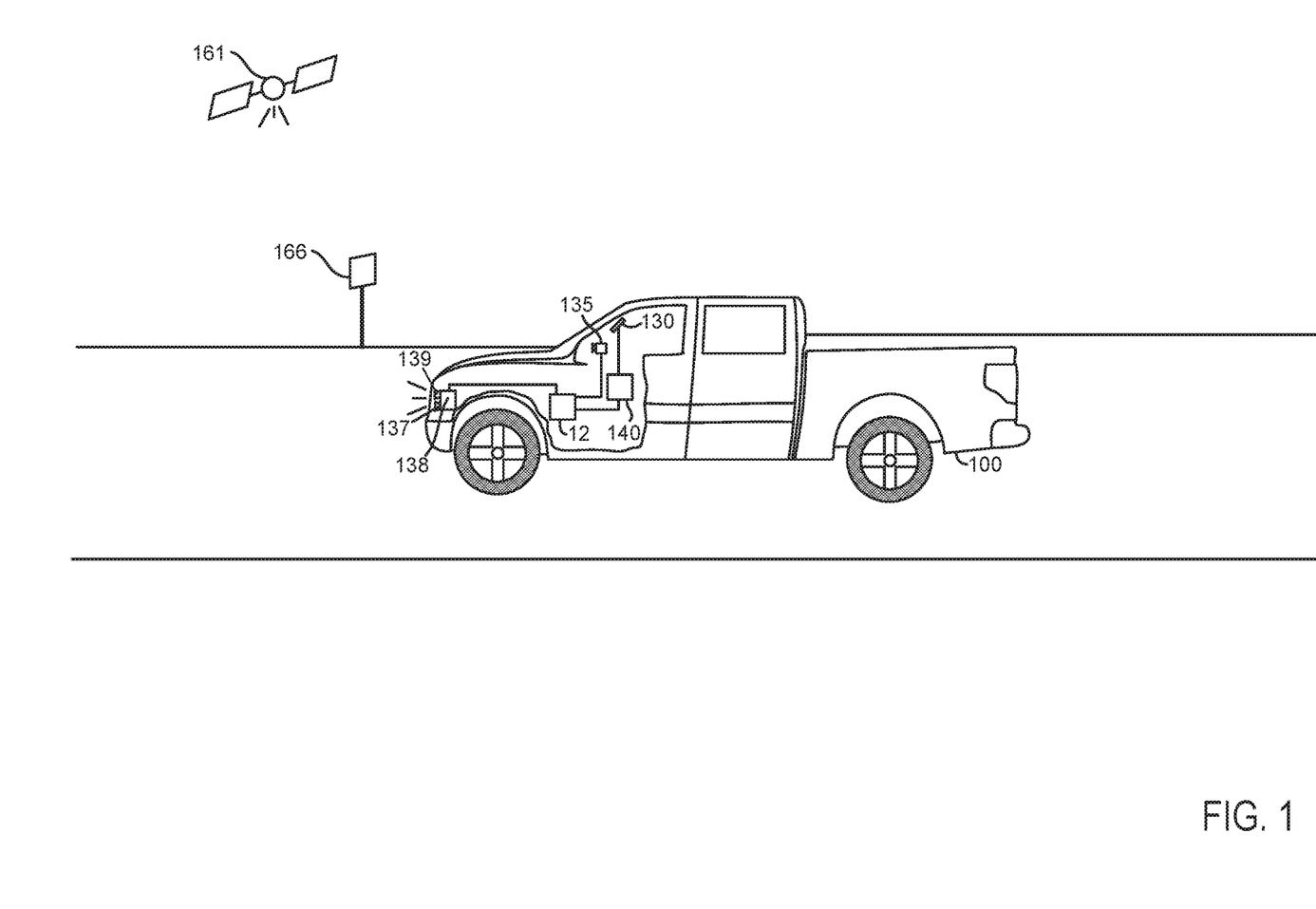
FIG. 1 shows an example vehicle including its distance to object sensing system and vision system.
Figure 2:
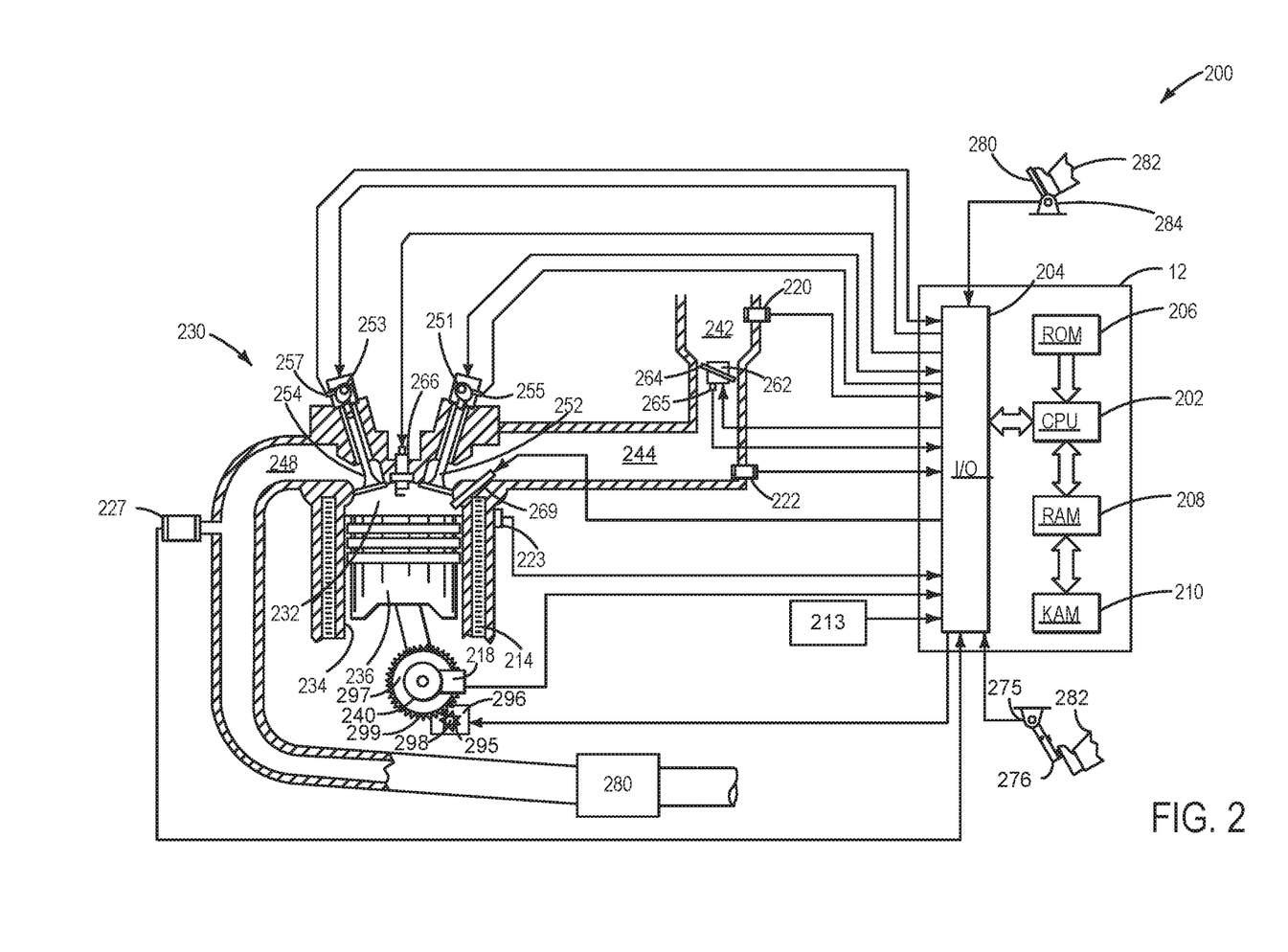
FIG. 2 shows an example vehicle motive power source.
Figure 3:
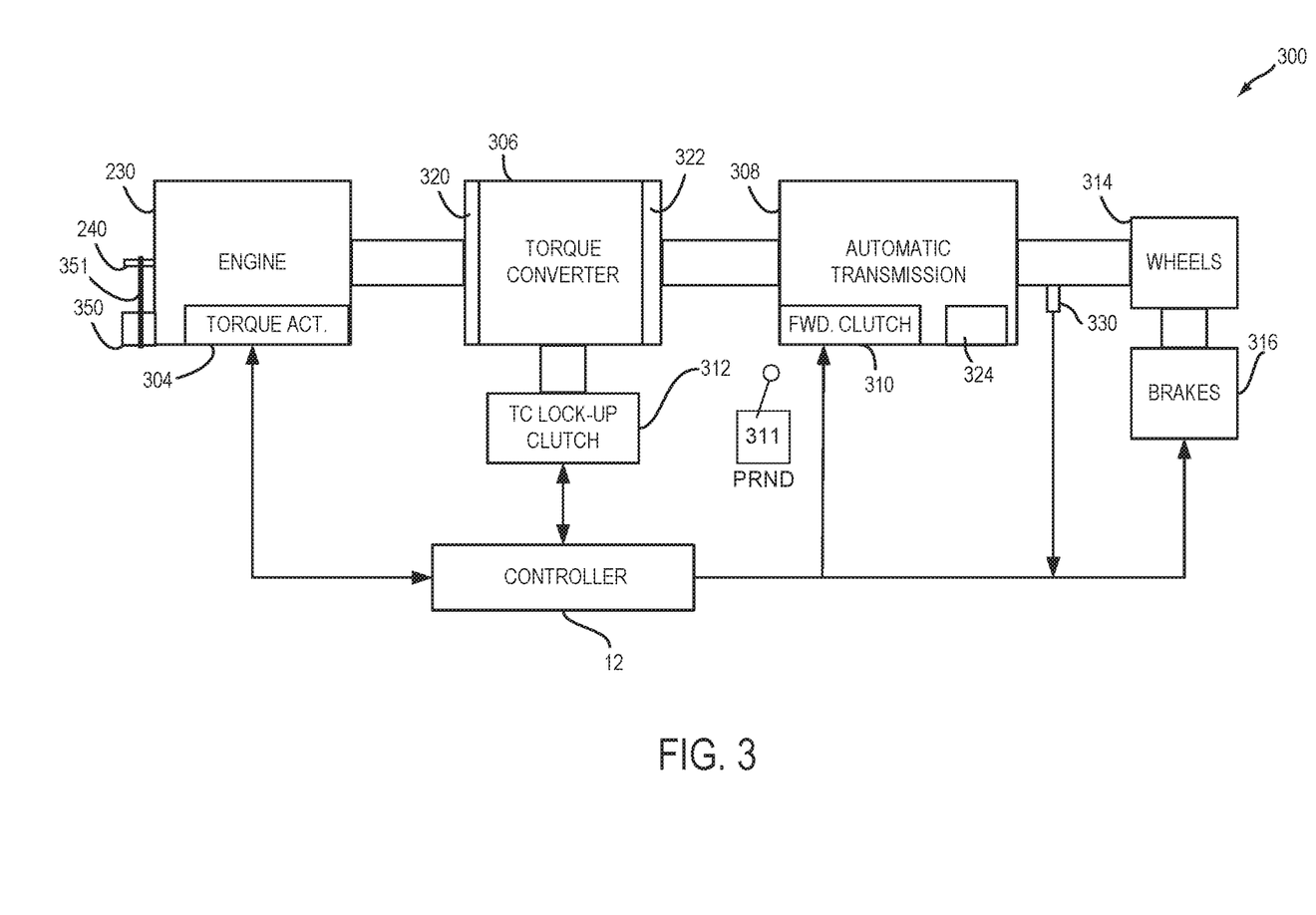
FIG. 3 shows an example vehicle driveline including the vehicle motive power source.
Figure 10:
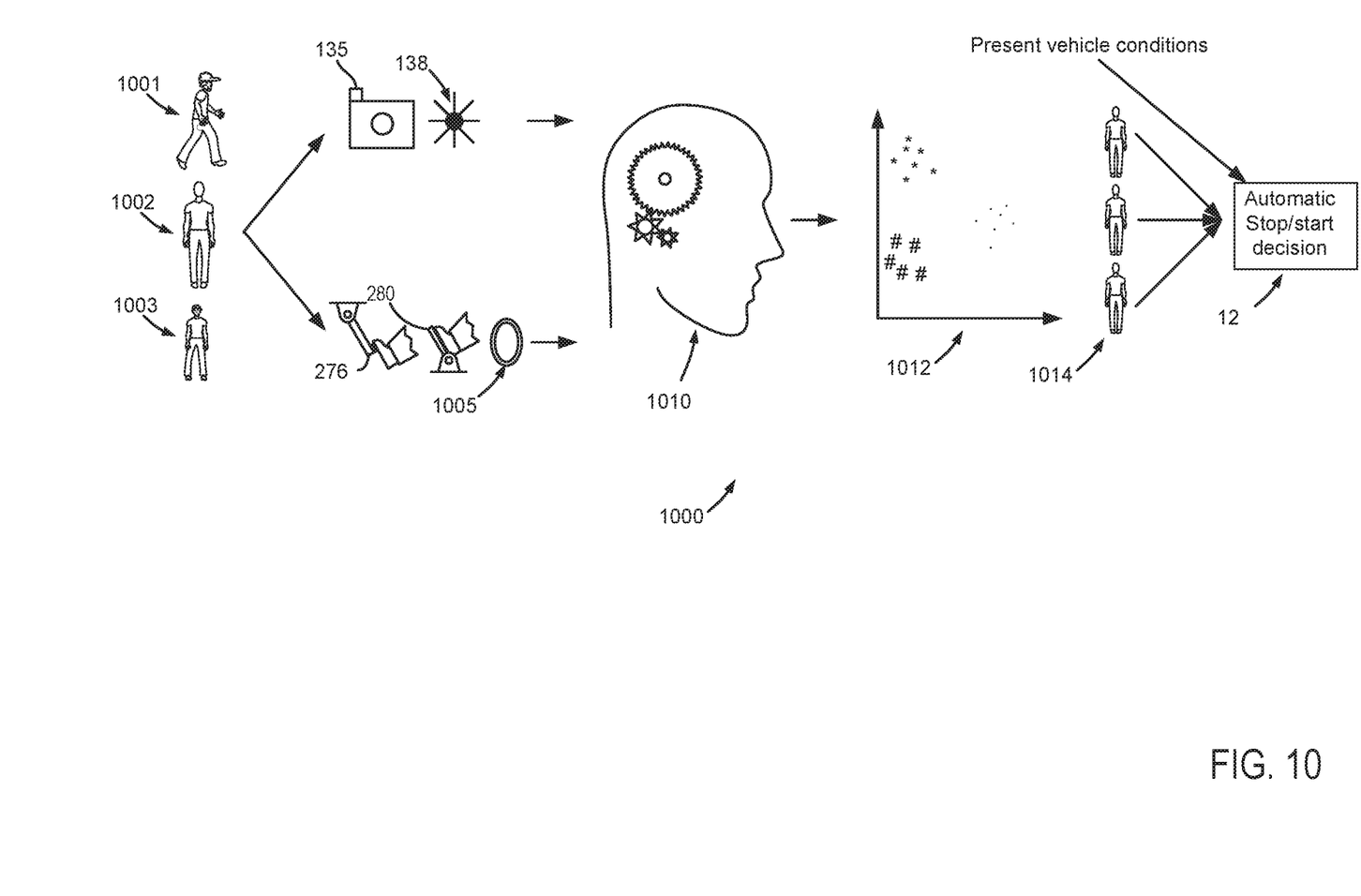
FIG. 10 shows system architecture for the automatic vehicle motive power source stop/start system that is described herein.
Figure 11:
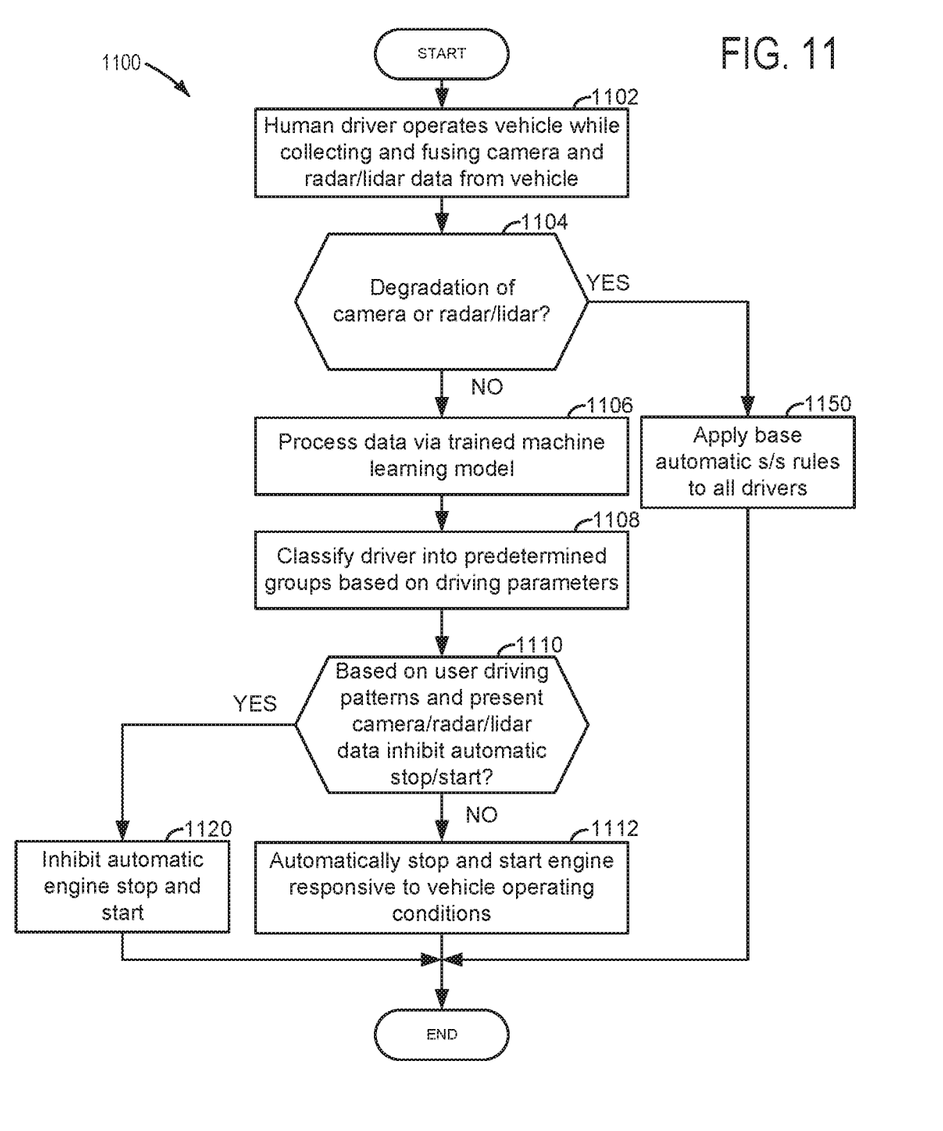
FIG. 11 shows a flowchart for an automatic vehicle motive power source stop/start system.

The following description relates to systems and methods for improving operation of automatic vehicle motive power source stopping and starting. FIG. 1 shows a vehicle that includes a vehicle motive power source that may be automatically stopped and started to conserve fuel and reduce emissions. FIGS. 2 and 3 show example driveline components for the vehicle shown in FIG. 1. Several different vehicle operating conditions for automatically stopping and starting a vehicle motive power source are shown in FIGS. 4-9. Architecture for automatic vehicle motive power source stopping and starting is shown in FIG. 10. A method for operating a vehicle and automatically stopping a vehicle motive power source to conserve fuel and reduce emissions is shown in FIG. 11.

Referring now to FIG. 1, vehicle 100 includes a controller 12 for receiving sensor data and adjusting actuators. Controller 12 may operate vehicle 100 responsive to vehicle operating conditions including but not limited to driver demand torque, vehicle speed, ambient temperature, vehicle motive power source temperature, and vehicle motive power source speed. Controller 12 may also automatically stop (e.g., stop the vehicle motive power source via the controller without human driver input to a device that has a sole purpose of stopping and starting the vehicle motive power source, such as a key switch or push button) and start (e.g., start the vehicle motive power source via the controller without human driver input to a device that has a sole purpose of stopping and starting the vehicle motive power source, such as a key switch or push button) the vehicle motive power source shown in FIG. 2, which is included in vehicle 100. In some examples, controller 12 may cooperate with additional controllers to operate vehicle 100. The controller 12 receives signals from the various sensors shown in FIGS. 1-3. Controller 12 employs the actuators shown in FIGS. 1-3 to adjust vehicle motive power source operation based on the received signals and instructions stored in memory of controller 12.

Vehicle 100 is shown with global positioning system (GPS) receiver 130. Satellite 161 provides time stamped information (e.g., data) to GPS receiver 130 which relays the information to vehicle position determining system 140. Vehicle positioning determination system 140 relays present and future road grade data to controller 12. Vehicle 100 is also shown equipped with camera 135 for surveying road conditions in the path of vehicle 135. For example, camera 135 may acquire road conditions from road side signs 166 or displays. Vehicle 100 also includes a distance to object sensing system 138 that includes a transmitter 139 for sending signals and a receiver 137 for receiving signals (e.g., reflected signals generated via transmitter 139) that indicate positions of objects in the driving for determining the proximity of vehicles in the travel path of vehicle 100. Alternatively, transmitter 139 and receiver 137 may be replaced by a transceiver. Distance to object sensing system 138 may be laser (e.g., light detection and ranging (LIDAR)), sound, or RADAR (e.g., radio detection and ranging) signal based. Distance to object sensing system 138 may determine a distance between vehicle 100 and objects (e.g., signs, traffic signals, animate objects, structures, etc.) in the vehicle's path.

Referring now to FIG. 2, an example vehicle motive power source 230 (e.g., an internal combustion vehicle motive power source or a fuel cell) is shown. In this example, the vehicle motive power source is a spark ignition vehicle motive power source. However, the vehicle motive power source may be a diesel vehicle motive power source, a turbine, or an electric machine.

FIG. 2 is schematic diagram showing a vehicle motive power source (e.g., one cylinder of a multi-cylinder vehicle motive power source) 230 in a vehicle motive power source system 200 is shown. Vehicle motive power source 230 may be controlled at least partially by a control system including a controller 12 and by input from a human vehicle operator 282 via an input device 280. In this example, the input device 280 includes an accelerator pedal and a pedal position sensor 284 for generating a proportional pedal position signal. Similarly, controller 12 may receive input from brake pedal position sensor 275 to determine a position of brake pedal 276. Human driver 282 may selectively apply brake pedal 276.

A combustion chamber 232 of the vehicle motive power source 230 may include a cylinder formed by cylinder walls 234 with a piston 236 positioned therein. The piston 236 may be coupled to a crankshaft 240 so that reciprocating motion of the piston is translated into rotational motion of the crankshaft. The crankshaft 240 may be coupled to at least one drive wheel of a vehicle via an intermediate transmission system as shown in FIG. 3. Flywheel 297 and ring gear 299 are coupled to crankshaft 240. Optional starter 296 (e.g., low voltage (operated with less than 30 volts) electric machine) includes pinion shaft 298 and pinion gear 295. Pinion shaft 298 may selectively advance pinion gear 295 to engage ring gear 299. Starter 296 may be directly mounted to the front of the vehicle motive power source or the rear of the vehicle motive power source. In some examples, starter 296 may selectively supply torque to crankshaft 240 via a belt or chain. In one example, starter 296 is in a base state when not engaged to the vehicle motive power source crankshaft. Starter 296 may selectively rotate crankshaft 240 to move piston 236.

Combustion chamber 232 may receive intake air from an intake manifold 244 via an intake passage 242 and may exhaust combustion gases via an exhaust passage 248. The intake manifold 244 and the exhaust passage 248 can selectively communicate with the combustion chamber 232 via respective intake valve 252 and exhaust valve 254. In some examples, the combustion chamber 232 may include two or more intake valves and/or two or more exhaust valves.

In this example, the intake valve 252 and exhaust valve 254 may be controlled by cam actuation via respective cam actuation systems 251 and 253. The cam actuation systems 251 and 253 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 252 and exhaust valve 254 may be determined by position sensors 255 and 257, respectively. In alternative examples, the intake valve 252 and/or exhaust valve 254 may be controlled by electric valve actuation. For example, the cylinder 232 may alternatively include an intake valve controlled via electric valve actuation and an exhaust valve controlled via cam actuation including CPS and/or VCT systems.

A fuel injector 269 is shown coupled directly to combustion chamber 232 for injecting fuel directly therein in proportion to the pulse width of a signal received from the controller 12. In this manner, the fuel injector 269 provides what is known as direct injection of fuel into the combustion chamber 232. The fuel injector may be mounted in the side of the combustion chamber or in the top of the combustion chamber, for example. Fuel may be delivered to the fuel injector 269 by a fuel system (not shown) including a fuel tank, a fuel pump, and a fuel rail. In some examples, the combustion chamber 232 may alternatively or additionally include a fuel injector arranged in the intake manifold 244 in a configuration that provides what is known as port injection of fuel into the intake port upstream of the combustion chamber 232.

Spark is provided to combustion chamber 232 via spark plug 266. The ignition system may further comprise an ignition coil (not shown) for increasing voltage supplied to spark plug 266. In other examples, such as a diesel, spark plug 266 may be omitted.

The intake passage 242 may include a throttle 262 having a throttle plate 264. In this particular example, the position of throttle plate 264 may be varied by the controller 12 via a signal provided to an electric motor or actuator included with the throttle 262, a configuration that is commonly referred to as electronic throttle control (ETC). In this manner, the throttle 262 may be operated to vary the intake air provided to the combustion chamber 232 among other vehicle motive power source cylinders. The position of the throttle plate 264 may be provided to the controller 12 by a throttle position signal. The intake passage 242 may include a mass air flow sensor 220 and a manifold air pressure sensor 222 for sensing an amount of air entering vehicle motive power source 230.

An exhaust gas sensor 227 is shown coupled to the exhaust passage 248 upstream of an emission control device 280 according to a direction of exhaust flow. The sensor 227 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOR, HC, or CO sensor. In one example, upstream exhaust gas sensor 227 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 280 is shown arranged along the exhaust passage 248 downstream of the exhaust gas sensor 227. The device 280 may be a three way catalyst (TWC), NOR trap, various other emission control devices, or combinations thereof. In some examples, during operation of the vehicle motive power source 230, the emission control device 280 may be periodically reset by operating at least one cylinder of the vehicle motive power source within a particular air-fuel ratio.

The controller 12 is shown in FIG. 2 as a microcomputer, including a microprocessor unit 202, input/output ports 204, an electronic storage medium for executable programs and calibration values shown as read only memory chip 206 (e.g., non-transitory memory) in this particular example, random access memory 208, keep alive memory 210, and a data bus. The controller 12 may receive various signals from sensors coupled to the vehicle motive power source 230, in addition to those signals previously discussed, including measurement of inducted mass air flow (MAF) from the mass air flow sensor 220; vehicle motive power source coolant temperature (ECT) from a temperature sensor 223 coupled to a cooling sleeve 214; a vehicle motive power source position signal from a Hall effect sensor 218 (or other type) sensing a position of crankshaft 240; throttle position from a throttle position sensor 265; and manifold absolute pressure (MAP) signal from the sensor 222. A vehicle motive power source speed signal may be generated by the controller 12 from crankshaft position sensor 218. Manifold pressure signal also provides an indication of vacuum, or pressure, in the intake manifold 244. Note that various combinations of the above sensors may be used, such as a MAF sensor without a MAP sensor, or vice versa. During vehicle motive power source operation, vehicle motive power source torque may be inferred from the output of MAP sensor 222 and vehicle motive power source speed. Further, this sensor, along with the detected vehicle motive power source speed, may be a basis for estimating charge (including air) inducted into the cylinder. In one example, the crankshaft position sensor 218, which is also used as a vehicle motive power source speed sensor, may produce a predetermined number of equally spaced pulses every revolution of the crankshaft.

Controller 12 may receive user input via human/machine interface 213. Controller 12 may also output data to a human via human/machine interface 213. Human/machine interface 213 may take the form of a display panel and keyboard or touch screen. Alternatively, human/machine interface 213 may take the form of push buttons and/or selector switches or other known human/machine interfaces. The vehicle's driver or occupants may selectively deactivate the automatic vehicle motive power source stop/start system via human/machine interface 213.

The storage medium read-only memory 206 can be programmed with computer readable data representing non-transitory instructions executable by the processor 202 for performing at least portions of the methods described below as well as other variants that are anticipated but not specifically listed.

During operation, each cylinder within vehicle motive power source 230 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 232 via intake manifold 244, and piston 236 moves to the bottom of the cylinder so as to increase the volume within combustion chamber 232. The position at which piston 236 is near the bottom of the cylinder and at the end of its stroke (e.g. when combustion chamber 232 is at its largest volume) is typically referred to by those of skill in the art as bottom dead center (BDC).

During the compression stroke, intake valve 252 and exhaust valve 254 are closed. Piston 236 moves toward the cylinder head so as to compress the air within combustion chamber 232. The point at which piston 236 is at the end of its stroke and closest to the cylinder head (e.g. when combustion chamber 232 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 266, resulting in combustion.

During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 2 shows only one cylinder of a multi-cylinder vehicle motive power source, and each cylinder may similarly include its own set of intake/exhaust valves, fuel injector, spark plug, etc.

Referring now to FIG. 3, a schematic of a vehicle drivetrain 300 is shown. Drivetrain 300 may be powered by vehicle motive power source 230 as shown in greater detail in FIG. 2. In one example, vehicle motive power source 230 may be a gasoline vehicle motive power source. In alternate examples, other vehicle motive power source configurations may be employed, for example, a diesel vehicle motive power source. Vehicle motive power source 230 may be started with a vehicle motive power source starting system (not shown). Further, vehicle motive power source 230 may generate or adjust torque via torque actuator 304, such as a fuel injector, throttle, cam, etc. A belt integrated starter/generator (BISG) 350, which may be referred to as an electric machine, motor, or generator, is shown coupled to vehicle motive power source 230 via belt 351. In this example, BISG 350 is coupled to crankshaft 240, but BISG 350 may be coupled to a camshaft in some examples. BISG 350 may consume vehicle motive power source power to charge a battery (not shown), or alternatively, BISG 350 may provide power to the driveline via vehicle motive power source crankshaft 240. Thus, BISG may propel the vehicle during some conditions.

A vehicle motive power source output torque may be transmitted to torque converter 306 to drive a step-ratio automatic transmission 308 by engaging one or more clutches, including forward clutch 310, where the torque converter may be referred to as a component of the transmission. Torque converter 306 includes an impeller 320 that transmits torque to turbine 322 via hydraulic fluid. One or more gear clutches 324 may be engaged to change gear ratios between vehicle motive power source 230 and vehicle wheels 314. The output of the torque converter 306 may in turn be controlled by torque converter lock-up clutch 312. As such, when torque converter lock-up clutch 312 is fully disengaged, torque converter 306 transmits torque to automatic transmission 308 via fluid transfer between the torque converter turbine 322 and torque converter impeller 320, thereby enabling torque multiplication. In contrast, when torque converter lock-up clutch 312 is fully engaged, the vehicle motive power source output torque is directly transferred via the torque converter clutch 312 to an input shaft of transmission 308. Alternatively, the torque converter lock-up clutch 312 may be partially engaged, thereby enabling the amount of torque relayed to the transmission to be adjusted. A controller 12 may be configured to adjust the amount of torque transmitted by the torque converter by adjusting the torque converter lock-up clutch in response to various vehicle motive power source operating conditions, or based on a driver-based vehicle motive power source operation request.

Automatic transmission may be shifted via shifter 311, which may be engaged in park "P", reverse "R", neutral "N", or drive "D". Torque output from the automatic transmission 308 may in turn be relayed to wheels 314 to propel the vehicle. Specifically, automatic transmission 308 may adjust an input driving torque at the input shaft (not shown) responsive to a vehicle traveling condition before transmitting an output driving torque to the wheels. Vehicle speed may be determined via speed sensor 330.

Further, wheels 314 may be locked by engaging wheel brakes 316. In one example, wheel brakes 316 may be engaged in response to the driver pressing his/her foot on a brake pedal (shown in FIG. 2). In the similar way, wheels 314 may be unlocked by disengaging wheel brakes 316 in response to the driver releasing his/her foot from the brake pedal.

FIGS. 1 and 2 include an internal combustion vehicle motive power source and a BISG, but the methods described herein are suitable for and applicable to other driveline configurations. For example, the methods described herein are suitable for parallel and series hybrid vehicles, vehicles having diesel vehicle motive power sources, and vehicles having fuel cells. Further, the approaches described herein may be applicable to determine when it is desirable to switch driveline operating modes (e.g., switching from propelling a vehicle via only an electric machine to propelling the vehicle via an internal combustion vehicle motive power source or propelling the vehicle via the internal combustion vehicle motive power source and the electric machine).

Thus, the system of FIGS. 1-3 provides for a vehicle motive power source control system, comprising: an internal combustion vehicle motive power source; a distance to object sensing system that transmits a signal and receives a reflected version of the signal; a camera; and a controller including executable instructions stored in non-transitory memory to automatically stop the internal combustion vehicle motive power source or inhibit automatic stopping of the internal combustion vehicle motive power source based on a combination of data from the distance to object sensing system and the camera, and instructions to characterize behavior of a human driver in one of a plurality of groups via a trained machine learning model. The vehicle motive power source system includes where the vehicle motive power source is automatically stopped via ceasing to flow fuel to the vehicle motive power source. The vehicle motive power source system further comprises additional instructions to inhibit automatically stop the internal combustion vehicle motive power source in response to a vehicle being within a threshold distance of a toll station. The vehicle motive power source system includes where the one of the plurality of groups is a performance group. The vehicle motive power source system includes where the one of the plurality of groups is a fuel economy group. The vehicle motive power source system further comprises additional instructions to adjust automatically stopping the internal combustion vehicle motive power source in response to the vehicle being staged for exiting a vehicle rental facility.

Figure 4:
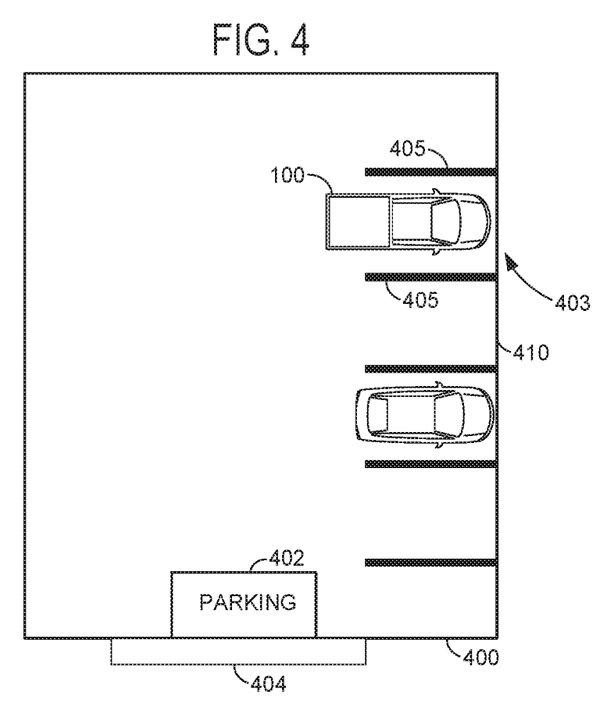
FIGS. 4-9 show example conditions that the present vehicle motive power source automatic stop/start system may evaluate to enable or disable automatic vehicle motive power source stopping and starting.

Referring now to FIG. 4, example conditions that may be detected by the present vehicle motive power source automatic stop/start system are shown. Images taken by camera 135 may be processed using character recognition and other imaging processes to determine that vehicle 100 is entering parking facility 400. Vehicle 100 may recognize that it is entering a parking area via recognizing that it is entering a building via door 404 and applying character recognition to images of parking sign 402. Further, images from camera 135 may be used to recognize that vehicle 100 is in parking space 403 via identifying lane stripes 405. Further, the present stop/start system may recognize that vehicle 100 is in parking facility 400 via its range detecting system recognizing walls 410. In one example, the present vehicle motive power source automatic stop/start system may automatically stop vehicle motive power source 230 in response to vehicle 100 stopping in parking space 403. In addition, the present vehicle motive power source automatic stop/start system may inhibit or prevent automatic vehicle motive power source starting in response to the vehicle motive power source being stopped and the vehicle being shifted from drive or reverse and into park. This may improve driver satisfaction by not restarting the vehicle motive power source in response to shifting the transmission to park. Thus, an unnecessary vehicle motive power source restart may be avoided.

Figure 5:
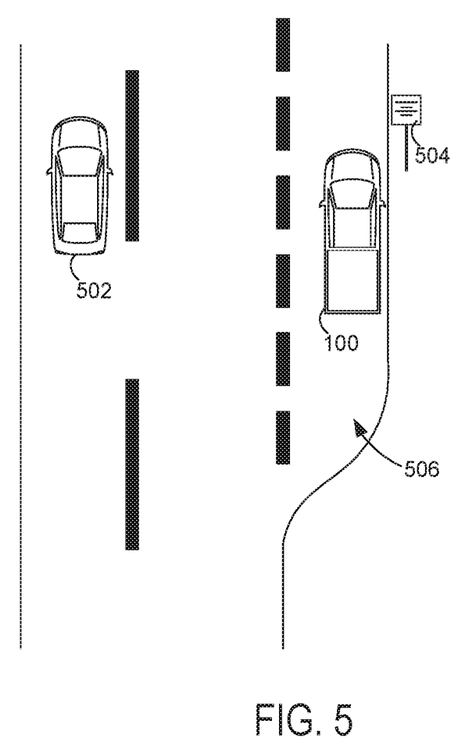

Turning now to FIG. 5, additional example conditions that may be detected by the present vehicle motive power source automatic stop/start system are shown. Images taken by camera 135 may be processed using character recognition and other imaging processes to determine that vehicle 100 is stopped in a delivery or pickup lane or zone 506. Vehicle 100 may recognize that it is entering or in delivery or pickup lane 506 via parking sign 504. In one example, the present vehicle motive power source automatic stop/start system may automatically stop vehicle motive power source 230 in response to vehicle 100 stopping in delivery or pickup lane or zone 506 via applying character recognition to images of sign 504 that are taken via a camera on board vehicle 100. In addition, the present vehicle motive power source automatic stop/start system may inhibit or prevent automatic vehicle motive power source starting in response to the vehicle motive power source being stopped for longer than a threshold amount of time (e.g., 2 minutes) while the vehicle is in delivery or pickup lane or zone 506. Thus, the present vehicle motive power source automatic stop/start system may prevent automatic vehicle motive power source restarting that is based on time when vehicle 100 has been automatically stopped in delivery or pickup lane or zone 506 so that fuel may be conserved.

Figure 6:
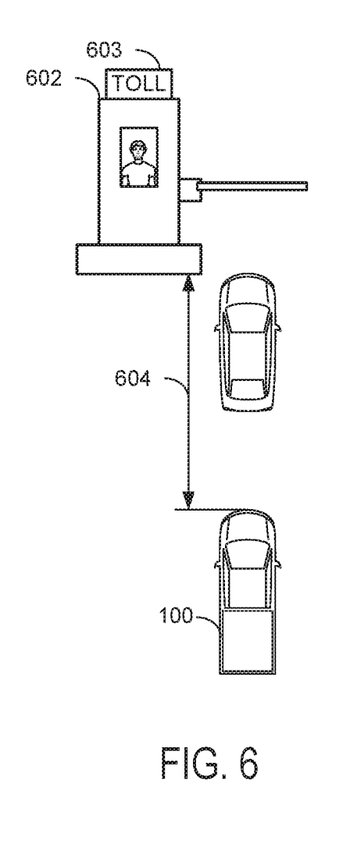

Referring now to FIG. 6, another example condition that may be detected by the present vehicle motive power source automatic stop/start system is shown. Images taken by camera 135 may be processed using character recognition and other imaging processes to determine that vehicle 100 is stopped for toll booth 602 (e.g., for road tolls) when vehicle 100 is within a predetermined distance 604 of toll booth 602. Vehicle 100 may recognize that it is approaching toll booth 602 via applying character recognition to images of sign 603 that are taken via the camera. In one example, the present vehicle motive power source automatic stop/start system may inhibit automatic vehicle motive power source stopping and not automatically stop vehicle motive power source 230 in response to vehicle 100 stopping within a predetermined distance (e.g., 100 meters) of toll booth 602. The distance 604 between the toll booth 602 and vehicle 100 may be determined via the vehicle's range detecting system. Thus, the present vehicle motive power source automatic stop/start system may prevent automatic vehicle motive power source stopping that is based on the vehicle being stopped when the vehicle is within a threshold distance of toll booth 602 so that a quick vehicle motive power source stop and start may be avoided, thereby providing higher levels of driver satisfaction.

Figure 7:
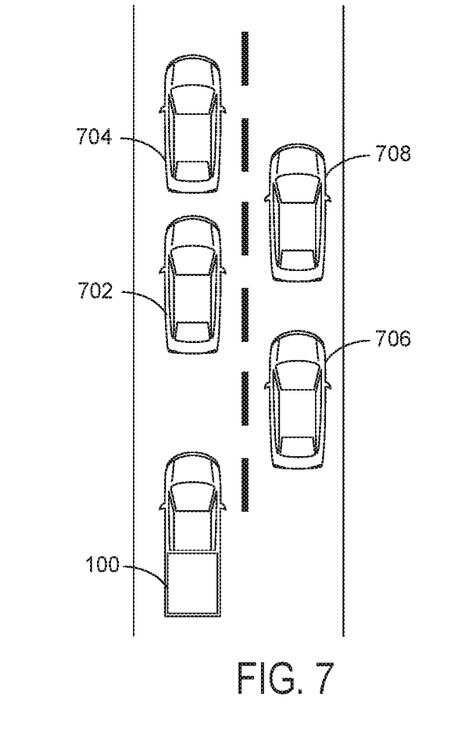

Referring now to FIG. 7, yet another example condition that may be detected by the present vehicle motive power source automatic stop/start system is shown. Images taken by camera 135 and distance measurements made via the distance to object sensing system of vehicle 100 may allow controller 12 to determine that vehicle 100 is in heavy traffic. For example, the present vehicle motive power source automatic stop/start system may recognize that vehicle 100 is in heavy traffic if the distance between vehicle 100 and 702 is less than a threshold and a speed of vehicle 100 is less than the posted vehicle speed limit. In one example, the present vehicle motive power source automatic stop/start system may adjust automatic vehicle motive power source stopping thresholds so that automatic vehicle motive power source stopping may inhibited when an amount of time the vehicle is stopped is greater than a threshold amount of time. Further, the present vehicle motive power source automatic stop/start system may prevent or inhibit automatic vehicle motive power source stopping when vehicle 100 moves between vehicle stops at a rate that is higher than a threshold frequency. For example, if the vehicle stops and then moves and then stops again and continues as such at a frequency above a threshold frequency (e.g., 0.3 Hertz) in heavy traffic, then automatic vehicle motive power source stopping may be inhibited while the vehicle is in heavy traffic, thereby providing higher levels of driver satisfaction. However, if the vehicle stops and then moves at a frequency that is below the predetermined frequency in heavy traffic, then automatic vehicle motive power source stopping may be realized. This may allow the driver to avoid frequent vehicle motive power source stops and starts during heavy traffic conditions. The threshold frequency may be adjusted responsive to the characterization of the present vehicle driver as will be explained in further detail later in the specification.

Figure 8:
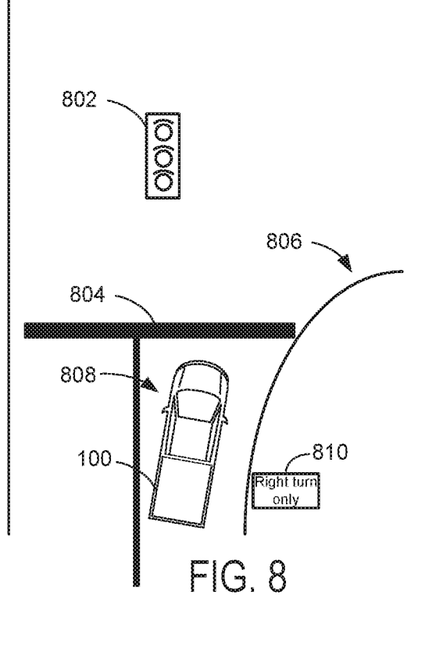

Referring now to FIG. 8, still another example condition that may be detected by the present vehicle motive power source automatic stop/start system is shown. Images taken by camera 135 may be processed to using character recognition and other imaging processes to determine that vehicle 100 is stopped for a right turn on red light. Vehicle 100 may recognize that it is approaching a right turn on red light via applying character recognition to writing on sign 810, recognizing red traffic light 802 via the camera, recognizing right turn only lane 808 via the camera, recognizing right turning road curb 806 via the camera, and recognizing vehicle stop line 804 via the camera. In one example, the present vehicle motive power source automatic stop/start system may not automatically stop vehicle motive power source 230 in response to vehicle 100 stopping for traffic light 802 while in right turn only lane 808 because the controller recognizes that vehicle 100 may stop only briefly to ensure cross traffic is not present before proceeding with the right turn. Thus, the present vehicle motive power source automatic stop/start system may prevent automatic vehicle motive power source stopping that is based on the vehicle being stopped in a right turn lane or a right turn only lane so that a quick vehicle motive power source stop and restart may be avoided.

Figure 9:
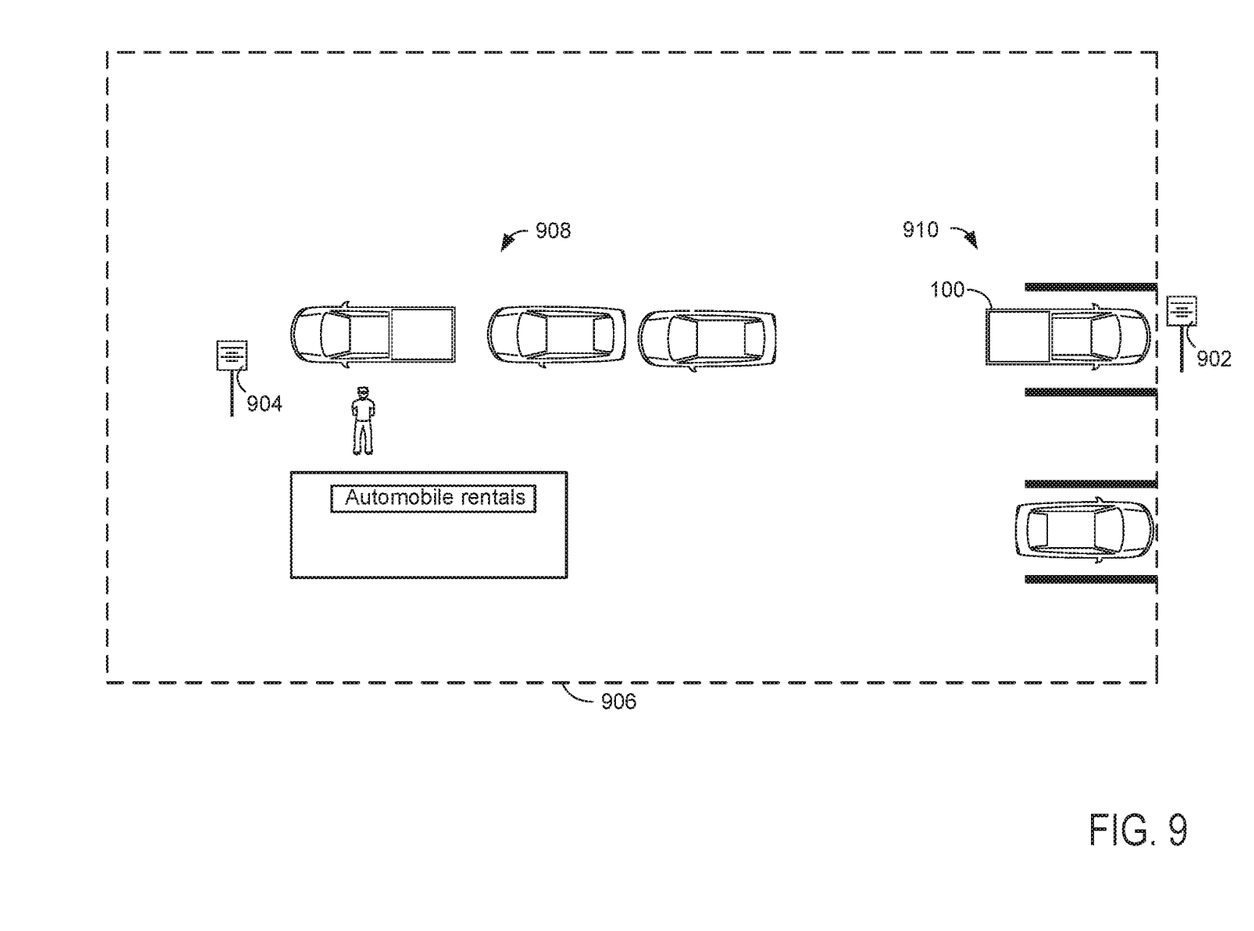

Referring now to FIG. 9, another example condition that may be detected by the present vehicle motive power source automatic stop/start system are shown. Images taken by camera 135 may be processed using character recognition and other imaging processes to determine that vehicle 100 is in vehicle rental facility 906. Vehicle 100 may recognize that it is in rental vehicle facility 906 by applying character recognition to images of parking sign 402. Further, images from camera 135 may be used to recognize that vehicle 100 is in staging area 908 via applying character recognition to sign 904. In one example, the present vehicle motive power source automatic stop/start system may automatically stop vehicle motive power source 230 in response to vehicle 100 stopping in staging area 908 even when vehicle motive power source temperature is less than a threshold temperature where the vehicle motive power source may be automatically stopped when not within a vehicle rental facility 906. This allows fuel to be conserved while the renter fills out necessary paperwork and inspects the vehicle. Further, vehicle motive power source 230 of vehicle 100 may be maintained automatically stopped for longer than a predetermined amount of time when vehicle 10 is located in staging area 100 so that fuel wasting idle conditions may be avoided. For example, vehicle 100 may be moved from parking space 910 and then the vehicle's motive power source may be automatically stopped when vehicle 100 reaches staging area 908 where the vehicle is processes for exiting the rental facility 906. Once vehicle 100 is in staging area 908, the vehicle motive power source may remain stopped to conserve fuel.

Moving on to FIG. 10, system architecture for the present automatic vehicle motive power source stop/start system is shown. System 1000 (e.g., included within controller 12) receives input from a plurality of different human drivers 1001-1003. The input is received via the brake pedal 276, accelerator pedal 280, steering wheel 1005, and other user interfaces. System 1000 also receives input from camera 135 and distance to object sensing system 138. Data from the user interfaces, camera 135, and distance to object sensing system 138 are input to a machine learning model, such as a neural network, 1010 where the data is applied to assign each of the plurality of drivers to one of a plurality of groups that are based on driving patterns as determined via the data input and the machine learning model. In one example, the groups include a vehicle fuel economy group, an intermediate group that provides some fuel economy benefit and some vehicle performance benefit, and a performance group that provides significant vehicle performance benefits and less fuel economy benefit. Membership of a driver in one of the groups may be based on data clusters 1012 with which data from a present driver may be compared. The present vehicle driver is then assigned as a member of one of the groups 1014. Once a driver is assigned to a group, then the driver's membership in the group may be a basis for judging whether or not automatic vehicle motive power source stopping and starting may be performed or prevented or inhibited via controller 12.

The automatic vehicle motive power source stop/start system may be developed and operated in phases. In a first phase, a group of human drivers and their driving patterns based on vehicle inputs are inputted into the machine learning model, along with camera and distance to object range finding data. The machine learning model is trained based on the raw data and predicted driver intentions. The trained model clusters each human driver based on their driving behavior, and then the conditions for automatic vehicle motive power source stopping and starting are adjusted according to driving situations and the group to which the present driver is assigned.

After a training phase, the system may enter a validation phase where the trained machine learning model is applied to a second group of human drivers that were not included in the group of human drivers that trained the machine learning model. If the system exhibits a high degree of accuracy determining when particular human drivers wish to engage or disengage the automatic vehicle motive power source stopping and starting system, then the system may be deployed to end users. The system characterizes inputs from end users (e.g., customers) and then assigns individual drivers to one of the previously mentioned groups. Automatic vehicle motive power source stopping and starting is then adjusted based on vehicle operating conditions and the group that the present vehicle driver is a member of.

Referring now to FIG. 11, an example method 1100 for adaptively automatically stopping and starting a vehicle motive power source to conserve fuel and reduce emissions is shown. At least portions of method 1100 may be included in a system as shown in FIG. 1-3 as executable instructions stored in non-transitory memory. The instructions may provide a control routine.

At 1102, a human driver operates a vehicle under varying driving conditions such as those shown in FIGS. 4-9 while data from user interfaces, the camera, and distance to object ranging system are received to the controller. For example, responses of a driver (e.g., application and release of brake pedals, steering wheel movement, and accelerator pedal movement) are monitored while a vehicle is driven over roads. Further, camera images and distance to object ranging data are captured via the controller while the human driver operates the vehicle. The responses of the driver and the images and ranging data are data that is applied to determine a group of drivers that the present driver belongs to. Method 100 proceeds to 1104.

At 1104, method 1100 judges if the camera or range sensing device is degraded. The camera may be degraded if the camera lens is obstructed or if the camera images are unidentifiable. If method 1100 judges that the camera or range sensing device is degraded, the answer is yes and method 1100 proceeds to 1150. Otherwise, the answer is no and method 1100 proceeds to 1106.

At 1150, method 1100 activates base automatic vehicle motive power source stopping and starting conditions. These conditions apply to all vehicle drivers. In one example, the vehicle motive power source temperature may have to be greater than a threshold temperature, the brake pedal applied, and the accelerator pedal fully released for the vehicle motive power source to automatically stop. Further, the battery state of charge (SOC) may have to be greater than a threshold charge for the vehicle motive power source to be automatically stopped. Method 1100 proceeds to exit.

At 1106, method 1100 processes the data gathered at 1102 via a trained machine learning model, such as a convolutional neural network. The trained model assesses the present driver's behavior, camera images, and distance to object ranging data relative to trained driver behaviors. Method 1100 proceeds to 1108.

At 1108, the machine learning model assigns the present driver to one of a plurality of driver groups. The driver groups may include but are not limited to economy drivers, intermediate drivers, and performance drivers. In one example, the trained machine learning model applies an unsupervised learning approach drawing references from datasets comprising input data without labeled responses. For example, a clustering technique determines how many groups exist based on the inputs (e.g., simply grouping data with similar characteristics).

One unsupervised learning technique may be referred to as clustering, which deals with finding a structure in a collection of unlabeled data. This technique organizes data into groups whose members are similar in some way. A "cluster" is a collection of objects which are 'similar' between them and are 'dissimilar' to objects belonging to other clusters. It can be shown that there is no absolute 'best' criterion to choosing the groups.

One way to decide what qualifies as 'good clustering,' proximity measurements may be taken between data points. Data points with close proximity should be in the same group. A 'good' proximity measure may be application dependent.

K-Means Clustering is one type of unsupervised learning algorithm that solves this clustering problem. The k-means procedure essentially partitions n samples into k clusters to minimize the sum of the squared distances to the cluster centers. When a model is trained, data may be applied from a set of participants and specify certain criteria, which includes the 'k' value, or number of groups/clusters. In the validation phase, it may be examined if this k value produces good results by using another set of participants from the 'validation' set. Once different k values are evaluated and desired results are achieved, this model may then be implemented into the vehicle.

The model may be implemented with a set of users in a testing phase for a period of time. The user's data may be further analyzed via over the air updates or other similar techniques. With this new information, the machine learning model may be adjusted accordingly (i.e. changing the number of groups/clusters) and implemented as an update back into the vehicle.

Method 1100 may also reclassify or regroup human drivers from time to time so that a driver may move from one group to another group. In one example, reclassification of a driver may be initiated at predetermined timing or driving intervals. For example, method 1100 may attempt to reclassify a driver every 100 hours of driving time or every 1000 kilometers of vehicle distance traveled. During reclassification, the driver may be placed in a different group if the driver's behavior has changed, or the driver may remain in the driver's present group. Method 1100 may also reclassify a driver based on environmental and geographic conditions. For example, method 1100 may perform a reclassification procedure of a driver in response to a change in driving conditions. In one example, method 1100 may perform the driver reclassification procedure during conditions of rain, snow fall, or when ambient temperatures are less than 5° C. so that the driver may become a member of a different group responsive to environmental conditions. Further, method 1100 may perform the driver reclassification procedure based on a geographical conditions. For example, method 1100 may perform the driver reclassification procedure when the vehicle is traveling through mountains, off road, or in a city so that the driver may become a member of a group other than the present group to which the driver is assigned in response to geographical conditions. Method 1100 proceeds to 1110.

At 1110, method 1100 evaluates present vehicle operating conditions as observed via the camera and the distance to object ranging device along with the group of drivers that the present driver is a member of to determine if the automatic vehicle motive power source stopping and starting system should be activated or inhibited. If method 1100 judges to inhibit automatic vehicle motive power source stopping and starting, then the answer is yes and method 1100 proceeds to 1120. Otherwise, the answer is no and method 1100 proceeds to 1112.

Method 1100 may apply the camera and distance to object range finding data to determine vehicle operating conditions. For example, the camera data and the distance to object range finding data may indicate that the vehicle is traveling in heavy traffic. The vehicle operating conditions are then evaluated with the group of drivers that the present driver is a member of to adjust automatic vehicle motive power source stopping and starting conditions to meet driver expectations. For example, if the driver falls into a fuel economy group of drivers and the vehicle is traveling in heavy traffic, then method 1100 may adjust the frequency at which the vehicle motive power source may be automatically stopped and started to a higher frequency (e.g., 0.3 Hertz). Conversely, if the driver falls into a performance group of drivers and the vehicle is traveling in heavy traffic, then method 1100 may adjust the frequency at which the vehicle motive power source may be automatically stopped and started to a lower frequency (e.g., 0.1 Hertz). This may allow the economy minded driver to conserve more fuel than the performance minded driver, but the performance minded driver may like the improved vehicle performance that may be achieved by not having to wait for the vehicle motive power source to start to move forward in the group of vehicles.

In another example, the present vehicle motive power source automatic stop/start system may inhibit automatic vehicle motive power source stopping and not automatically stop vehicle motive power source 230 in response to vehicle 100 stopping within a predetermined distance (e.g., 100 meters) of toll booth 602 when the present driver is in a performance group of drivers. Conversely, the present vehicle motive power source automatic stop/start system may initiate automatic vehicle motive power source stopping and stop vehicle motive power source 230 in response to vehicle 100 stopping within a predetermined distance (e.g., 100 meters) of toll booth 602 when traffic is stopping for longer than a predetermined amount of time when the present driver is in an economy group of drivers.

In another example, the present vehicle motive power source automatic stop/start system may not automatically stop vehicle motive power source 230 in response to vehicle 100 stopping for traffic light 802 while in right turn only lane 808 when the present driver of the vehicle belongs to a performance group of drivers. However, the present vehicle motive power source automatic stop/start system may automatically stop vehicle motive power source 230 in response to vehicle 100 stopping for traffic light 802 while in right turn only lane 808 when other vehicles are in front of the present vehicle and stopped when the present driver of the vehicle belongs to an economy group of drivers.

Additionally, the automatic vehicle motive power source stopping and starting system may recognize and respond to vehicle operating conditions as described in FIGS. 4-9. Further, the conditions for which automatic vehicle motive power source stopping is prevented may be adjusted responsive to a present driver's membership in a group of drivers (e.g., economy drivers). Likewise, the conditions for which automatic vehicle motive power source stopping occurs may be adjusted responsive to a present driver's membership in a group of drivers (e.g., performance drivers).

Variables from multiple sensory inputs enable use of high-resolution independent variables to elucidate classes of driver habits and preferences, which are also determined by their relation to differing preference thresholds for a fuel-saving feature like automatic engine stop/start to engage. This additional information provides the benefit of improved prediction power. For example, instead of simply having steering wheel angle, adding on other sensors like a camera, radar, and possibly sonar and LIDAR, the machine learning model may determine that the vehicle is in fact at a right-turn lane at a traffic intersection when the steering wheel angle is sharply turned rather than predicting that most customers would be turning when the steering wheel is at that angle.

Customization of start-stop inhibit rules may be provided to meet operational criteria and where possible adapt to predicted consumer preference may take two forms.

The first may be a binary decision. Under a circumstance where the vehicle's multitude of sensors predict a scenario that some consumer driving patterns and/or past use of the in-cabin start-stop inhibit button (e.g., via the user interface) would indicate preference for fuel savings but would cause others to more likely manually inhibit start-stop for the trip via the in-cabin button. Examples include a case where freeway traffic congestion has brought traffic to a complete stop, or the aforementioned right-turn lane situation, where in each case the stop has been predicted to last more than enough time for start-stop to save fuel.

The second may take the form of a continuous decision strategy. For example, if a driver's historical patterns point to driver preference toward aggressiveness and fast sprints from intersections, the unsupervised machine learning algorithm would inevitably cluster this individual among others with similar traits. In the example of a longer traffic intersection light, the data may lead to a prediction that the driver prefers that the engine start up at some continuous amount of time (e.g., depending on which cluster or group the driver belongs in) prior to the light turning green. Note that an existing start-stop rule on some vehicles may be to turn the engine back on at a threshold amount of time, for example two minutes. The present system and method may recognize the traffic setting, thus overriding the two-minute threshold to maximize fuel savings, and by allowing the vehicle to perform more in line with the driver's preferences such that for the three-minute red light cases, stop-start was not already disabled by the driver.

At 1120, method 1100 inhibits automatic vehicle motive power source stopping and the vehicle motive power source continues to operate and combust fuel. Method 1100 proceeds to exit.

At 1112, method 1100 automatically stops the vehicle motive power source and starts the vehicle motive power source responsive to vehicle operating conditions and the group of drivers that the present driver of the vehicle belongs to. The vehicle motive power source may be automatically stopped via ceasing to supply fuel to the vehicle motive power source (e.g., closing fuel injectors). The vehicle motive power source may be automatically started via rotating the vehicle motive power source and supplying spark and fuel to the vehicle motive power source.

In this way, conditions under which a vehicle motive power source may be automatically stopped and started may be adjusted responsive to a present driver's membership in one of a plurality of driver groups. The driver group boundaries may be established via a trained machine learning model and the trained machine learning model may assign a present driver of the vehicle to a group based on the driver's behavior.

Thus, the method of FIG. 11 provides for a vehicle motive power source operating method, comprising: identifying present vehicle operating conditions of a vehicle via a controller responsive to a combination of data provided via a camera and data provided via a range sensing device; assigning a human driver to one of a plurality of driver groups via a trained machine learning model; automatically stopping a vehicle motive power source via the controller responsive to the human driver being assigned to a group included in the plurality of driver groups and the present vehicle operating conditions. The method includes where identifying present vehicle operating conditions includes identifying that the vehicle is at a vehicle rental facility and stopped for exit processing, and further comprising: automatically stopping the vehicle motive power source in further response to vehicle motive power source temperature being less than a threshold temperature; and maintaining the vehicle motive power source automatically stopped for longer than a threshold time duration in response to identifying that the vehicle is at the vehicle rental facility. The method includes where the plurality of driver groups may include a fuel saving group, a performance group, and an intermediate group. The method includes where identifying present vehicle operating conditions includes identifying that the vehicle is in a predefined parking location, and further comprising: not automatically starting the vehicle motive power source after automatically stopping the vehicle motive power source in further response to a human driver shifting a transmission to park and releasing a brake pedal. The method includes where the parking location is parking space in a parking garage. The method includes where the parking location is a delivery zone of a road. The method further comprises not automatically stopping the vehicle motive power source via the controller responsive to the human driver being assigned to the group included in the plurality of driver groups and the present vehicle operating conditions when the camera or the range sensing device is degraded.

The method of FIG. 11 also provides for a vehicle motive power source operating method, comprising: identifying present vehicle operating conditions of a vehicle via a controller responsive to a combination of data provided via a camera and data provided via a range sensing device; assigning a human driver to one of a plurality of driver groups via a trained machine learning model; inhibiting automatic stopping of a vehicle motive power source via the controller responsive to the human driver being assigned to a group included in the plurality of driver groups and the present vehicle operating conditions. The method includes where the present vehicle operating conditions include the vehicle being stopped for a traffic signal in a right hand turn lane. The method includes where the right hand turn lane is a right hand turn only lane. The method includes where the present vehicle operating conditions include being within a threshold distance of a road toll station. In some examples, the method includes where the present vehicle operating conditions include the vehicle being in heavy traffic on a road that moves between vehicle stops at a rate above a threshold frequency. The method includes where the threshold frequency is greater than 0.3 Hertz. The method includes where identifying vehicle operating conditions includes performing character recognition on data from a sign.

In another representation, the method of FIG. 11 provides for a vehicle motive power source operating method, comprising: identifying first vehicle operating conditions of a vehicle via a controller responsive to data provided via a camera and data provided via a range sensing device while a first driver is driving a vehicle; identifying second vehicle operating conditions of the vehicle via the controller responsive to data provided via the camera and data provided via the range sensing device while a second driver is driving a vehicle; stopping a vehicle motive power source of the vehicle in response to the first vehicle operating conditions and the first driver, and not stopping the vehicle motive power source of the vehicle in response to the second vehicle operating conditions and the second driver, the first vehicle operating conditions being same or equal to the second vehicle operating conditions. The method includes where the first driver is in a group of economy drivers and where the second driver is in a group of performance drivers.

Note that the example control and estimation routines included herein can be used with various vehicle motive power source and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other vehicle motive power source hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle motive power source control system, where the described actions are carried out by executing the instructions in a system including the various vehicle motive power source hardware components in combination with the electronic controller.

This concludes the description. The reading of it by those skilled in the art would bring to mind many alterations and modifications without departing from the spirit and the scope of the description. For example, I3, I4, I5, V6, V8, V10, and V12 vehicle motive power sources operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle motive power source operating method, comprising:
   identifying present operating conditions of a vehicle via a controller responsive to a combination of data provided via a camera and data provided via a range sensing device;
   assigning a human driver to one of a plurality of driver groups via a trained machine learning model; and
   automatically stopping a vehicle motive power source via the controller responsive to the human driver being assigned to a group included in the plurality of driver groups and the present operating conditions, where identifying present vehicle operating conditions includes identifying that the vehicle is in a predefined parking location, and further comprising:
      not automatically starting the vehicle motive power source after automatically stopping the vehicle motive power source in further response to a human driver shifting a transmission to park and releasing a brake pedal.

2. A vehicle motive power source operating method, comprising:
   identifying present operating conditions of a vehicle via a controller responsive to a combination of data provided via a camera and data provided via a range sensing device;
   assigning a human driver to one of a plurality of driver groups via a trained machine learning model; and
   automatically stopping a vehicle motive power source via the controller responsive to the human driver being assigned to a group included in the plurality of driver groups and the present operating conditions, where identifying present vehicle operating conditions includes identifying that the vehicle is at a vehicle rental facility and stopped for exit processing, and further comprising:
      automatically stopping the vehicle motive power source in further response to vehicle motive power source temperature being less than a threshold temperature; and
      maintaining the vehicle motive power source automatically stopped for longer than a threshold time duration in response to identifying that the vehicle is at the vehicle rental facility.

3. The method of claim 1, where the plurality of driver groups includes a fuel saving group, a performance group, and an intermediate group.

4. The method of claim 1, where the parking location is parking space in a parking garage.

5. The method of claim 1, where the parking location is a delivery zone of a road.

6. The method of claim 1, further comprising not automatically stopping the vehicle motive power source via the controller responsive to the human driver being assigned to the group included in the plurality of driver groups and the present vehicle operating conditions when the camera or the range sensing device is degraded.

7. A vehicle motive power source control system, comprising:
   an internal combustion vehicle motive power source;
   a distance to object sensing system that transmits a signal and receives a reflected version of the signal;
   a camera; and
   a controller including executable instructions stored in non-transitory memory to automatically stop the internal combustion vehicle motive power source or inhibit automatic stopping of the internal combustion vehicle motive power source based on a combination of data from the distance to object sensing system and the camera, to characterize behavior of a human driver in one of a plurality of groups via a trained machine learning model, and to adjust automatically stopping the internal combustion vehicle motive power source in response to the vehicle being staged for exiting a vehicle rental facility.

8. The vehicle motive power source system of claim 7, where the vehicle motive power source is automatically stopped via ceasing to flow fuel to the vehicle motive power source.

9. The vehicle motive power source system of claim 7, further comprising additional instructions to inhibit automatically stop the internal combustion vehicle motive power source in response to a vehicle being within a threshold distance of a toll station.

10. The vehicle motive power source system of claim 7, where the one of the plurality of groups is a performance group.

11. The vehicle motive power source system of claim 7, where the one of the plurality of groups is a fuel economy group.

* * * * *